(12) United States Patent
Eyal et al.

(10) Patent No.: US 11,407,236 B2
(45) Date of Patent: Aug. 9, 2022

(54) HEATING FLUID PRINT AGENT WITH ULTRAVIOLET RADIATION

(71) Applicant: Hewlett-Packard Development Company, L.P., Spring, TX (US)

(72) Inventors: Ehud Eyal, Nes Ziona (IL); Nadav Shalem, Nes Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/254,414

(22) PCT Filed: Mar. 22, 2019

(86) PCT No.: PCT/US2019/023576
§ 371 (c)(1),
(2) Date: Dec. 21, 2020

(87) PCT Pub. No.: WO2020/197536
PCT Pub. Date: Oct. 1, 2020

(65) Prior Publication Data
US 2022/0024227 A1    Jan. 27, 2022

(51) Int. Cl.
*B41J 11/00*    (2006.01)
*G03G 15/20*    (2006.01)
*G03G 13/10*    (2006.01)
*G03G 13/11*    (2006.01)
*G03G 13/20*    (2006.01)
*G03G 13/01*    (2006.01)

(52) U.S. Cl.
CPC ........ *B41J 11/00214* (2021.01); *G03G 13/10* (2013.01); *G03G 13/11* (2013.01); *G03G 13/20* (2013.01); *G03G 15/2007* (2013.01); *G03G 15/2098* (2021.01); *G03G 13/0131* (2021.01)

(58) Field of Classification Search
CPC ... B41J 11/00214; G03G 13/10; G03G 13/11; G03G 13/20; G03G 15/2007
See application file for complete search history.

(56) References Cited

U.S. PATENT DOCUMENTS

| | | | |
|---|---|---|---|
| 5,397,673 A | 3/1995 | Watson et al. | |
| 6,957,030 B2 | 10/2005 | Baker, Jr. et al. | |
| 8,628,187 B2 | 1/2014 | Roof et al. | |
| 2005/0058921 A1* | 3/2005 | Heilman | G03G 9/0831 |
| | | | 430/97 |

(Continued)

FOREIGN PATENT DOCUMENTS

| | | |
|---|---|---|
| JP | 05142967 | 6/1993 |
| JP | 2007188025 | 7/2007 |
| WO | WO-2017131709 | 8/2017 |

*Primary Examiner* — Bradley W Thies
(74) *Attorney, Agent, or Firm* — Fabian VanCott

(57) ABSTRACT

A method is disclosed. The method may comprise applying a coating of electrically charged fluid print agent to a developer surface, the fluid print agent comprising particles of thermoplastic resin in a carrier fluid. The method may further comprise controlling migration of fluid print agent from the developer surface to form an image from fluid print agent on a first surface. The method may further comprise irradiating the print agent on the first surface with ultraviolet radiation to heat the print agent to a temperature of at least 70° C. to melt the thermoplastic resin. A print system and a heating unit are also disclosed.

20 Claims, 4 Drawing Sheets

(56) References Cited

U.S. PATENT DOCUMENTS

| | | |
|---|---|---|
| 2007/0031751 A1 | 2/2007 | Teishev et al. |
| 2009/0029278 A1 | 1/2009 | Op De Beeck et al. |
| 2010/0238318 A1 | 9/2010 | Ishibashi |
| 2010/0283188 A1 * | 11/2010 | Rohner .............. A61C 13/0013 264/401 |
| 2018/0004110 A1 | 1/2018 | Ron et al. |

* cited by examiner

HEATING FLUID PRINT AGENT WITH ULTRAVIOLET RADIATION

BACKGROUND

In some print operations, a printed image may be formed from a fluid print agent where the print agent comprises a thermoplastic resin. The fluid print agent may be applied to a surface and dried, for example using hot air drying or infrared irradiation.

BRIEF DESCRIPTION OF DRAWINGS

Examples will now be described, by way of non-limiting example, with reference to the accompanying drawings, in which.

DETAILED DESCRIPTION

In some print processes, an image on a printed substrate may be formed by the controlled application of at least one print agent, e.g. ink, to the substrate. Some print processes involve use of at least one print agent, such as an LEP ink, which comprises at least one component selected for certain optical properties, for example a colorant or pigment, and also a thermoplastic resin. The print agent may be controllably applied to a surface in a fluid state, for instance the fluid print agent may comprise thermoplastic resin particles, in a carrier fluid. In some print processes the fluid print agent may be capable of carrying an electric charge and may be applied to the surface by controlled electrostatic transfer, for example by electrophotography or xerography or a similar or related process.

Once the fluid print agent is deployed on the surface, it may be heated to dry the print agent by evaporation of the carrier fluid. The heat applied for drying also causes the thermoplastic resin of the print agent to melt. The melted thermoplastic resin in continuous areas on the surface may then be allowed to fuse together and cool and set.

In some print processes, fluid print agent is controllably applied to an intermediate surface and then heated on the intermediate surface, for example by use of an infrared source or hot air, to remove dry the print agent, i.e. to remove the carrier fluid, and to melt the thermoplastic resin. Infrared radiation may be absorbed by the intermediate surface, which causes heating of the surface and hence heating of the fluid print agent by conduction. Drying the fluid print agent on an intermediate surface, before transfer to the substrate for the print product, avoids heating of the print substrate, which may become damaged or degraded by heating, especially for some substrates comprising plastic material.

The image formed from fused print agent, e.g. where the thermoplastic resin has at least partially set, may then be transferred to the print substrate, for example by contact pressure, to provide the printed substrate for the print product.

The present disclosure relates to methods, systems and apparatus of printing using print agents comprising thermoplastic resin. The methods, systems and apparatus of some examples of the present disclosure can provide power efficient heating of fluid print agents to melt a thermoplastic resin. The heating may also provide drying of the fluid print agent. The methods, systems and apparatus of some examples of the present disclosure can provide heating to melt a thermoplastic resin component of a print agent disposed on a print substrate for a print product, without thermal degradation of the print substrate, even for temperature sensitive substrates.

Figure 1:
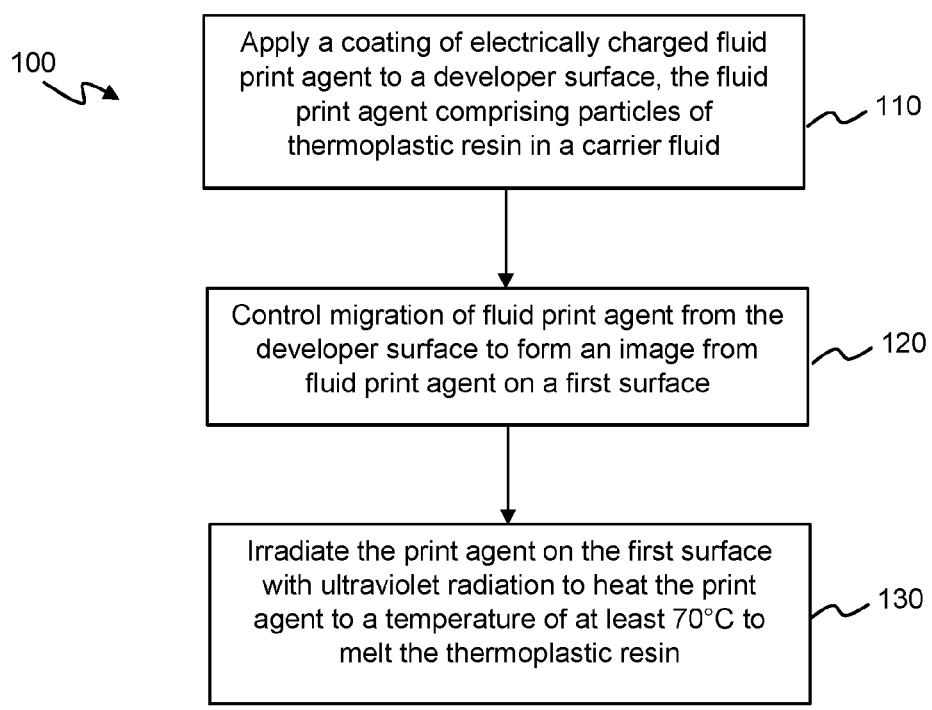
FIG. 1 is a flowchart of an example of a method.

FIG. 1 illustrates a flowchart of a method 100 according to one example. The method comprises, at block 110, applying a coating of electrically charged fluid print agent to a developer surface, the fluid print agent comprising thermoplastic resin in a carrier fluid. The method also comprises, at block 120, controlling migration of fluid print agent from the developer surface to form an image from fluid print agent on a first surface. The method 100 further comprises, at block 130, irradiating the print agent on the first surface with ultraviolet radiation to heat the print agent to a temperature of at least 70° C. to melt the thermoplastic resin.

The method 100 of the example illustrated in FIG. 1 is thus a method of heating a print agent comprising a thermoplastic resin using UV radiation to melt the thermoplastic resin. The melted thermoplastic resin in continuous areas on the first surface may merge and be allowed to fuse together.

As used herein a print agent comprising a thermoplastic resin is a composition, for example an ink such as a liquid electrophotographic (LEP) ink, which may be controllably applied to a surface in fluid form to form at least part of an image and which may be heated to melt the thermoplastic resin, which then fuses as part of a print process. The print agent is thus a print agent which is suitable for being controllably applied in a desired pattern in a fluid state and then fused by heating the print agent to melt the thermoplastic resin and allowing continuous areas of thermoplastic resin to fuse together.

The print agent comprises at least one component which is a thermoplastic resin, and at least one component selected for certain optical properties, for instance a colorant such as a pigment or the like. The fluid print agent may comprise particles of thermoplastic resin and colorant disposed in a carrier fluid. In some examples, the colorant may be encapsulated in the thermoplastic resin. Note that whilst the optical property may comprise a particular colour or optical effect within the visible spectrum, in some instances the optical properties could be properties in response to illumination with radiation outside of the visible range, and the terms optical, colorant and pigment will be understood accordingly. The term image will also be understood as relating to any particular pattern of print agent, e.g. any generally two-dimensional arrangement on a surface, which could, in some instances, be continuous coverage of the whole surface area.

In some examples, the thermoplastic resin may comprise a copolymer of an alkylene monomer and a monomer selected from acrylic acid and methacrylic acid. In some examples, the thermoplastic resin may comprise a copolymer of an ethylene acrylic acid resin, an ethylene methacrylic acid resin or combinations thereof. In some examples, the thermoplastic resin may comprise an ethylene acrylic acid resin, an ethylene methacrylic acid resin or combinations thereof. In some examples, the carrier fluid is a hydrocarbon carrier liquid such as an isoparaffinic carrier liquid, for example Isopar-L™ (available from EXXON CORPORATION).

The thermoplastic resin may be selected from ethylene acrylic acid copolymers; methacrylic acid copolymers; ethylene methacrylic acid copolymers; ethylene vinyl acetate copolymers; copolymers of ethylene (e.g. 80 wt % to 99.9 wt %) and alkyl (e.g. C1 to C5) ester of methacrylic or acrylic acid (e.g. 0.1 wt % to 20 wt %); copolymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g. copolymer of acrylic or methacrylic acid and at least one alkyl ester of acrylic or methacrylic acid wherein alkyl may include from 1 to about 20 carbon atoms, such as methyl methacrylate (e.g. 50 wt % to 90 wt %)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

In some examples, the thermoplastic resin comprises a first polymer that is a copolymer of ethylene or propylene and an ethylenically unsaturated acid of either acrylic acid or methacrylic acid. In some examples, the first polymer is absent ester groups and the thermoplastic resin further comprises a second polymer having ester side groups that is a co-polymer of (i) a first monomer having ester side groups selected from esterified acrylic acid or esterified methacrylic acid, (ii) a second monomer having acidic side groups selected from acrylic or methacrylic acid and (iii) a third monomer selected from ethylene and propylene.

Prior to printing the resin may constitute 5% to 99% by weight of the solids in the fluid print agent composition, in some examples, 50% to 90% by weight of the solids of the fluid print agent composition, in some examples, 70% to 90% by weight of the solids of the fluid print agent composition. The remaining wt % of the solids in the fluid print agent composition may be the colorant and, in some examples, any other additives that may be present.

The resin may comprise a polymer, in some examples a polymer having acidic side groups, that has a melt flow rate of less than about 70 g/10 minutes, in some examples about 60 g/10 minutes or less, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of, in some examples, about 50 g/10 minutes to about 120 g/10 minutes, in some examples 60 g/10 minutes to about 100 g/10 minutes. The melt flow rate can be measured using standard procedures known in the art, for example as described in ASTM D1238.

The resin may comprise two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The ratio of the first polymer having acidic side groups to the second polymer having acidic side groups can be from about 10:1 to about 2:1. The ratio can be from about 6:1 to about 3:1, in some examples about 4:1.

The resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 or AC-5180 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

If the resin comprises a single type of polymer, the polymer (excluding any other components of the electrophotographic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the resin comprises a plurality of polymers all the polymers of the resin may together form a mixture (excluding any other components of the electrophotographic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

The polymer, polymers, co-polymer or co-polymers of the resin can in some examples be selected from the Nucrel family of toners (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, Bynell 2020 and Bynell 2022, (sold by E. I. du PONT)), the Aclyn family of toners (e.g. Aclyn 201, Aclyn 246, Aclyn 285, and Aclyn 295), and the Lotader family of toners (e.g. Lotader 2210, Lotader, 3430, and Lotader 8200 (sold by Arkema)).

In some examples, the colorant may be a pigment selected from a cyan pigment, a magenta pigment, a yellow pigment and a black pigment. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW 5GT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200. Where the pigment is a white pigment particle, the pigment particle may be selected from the group consisting of TiO2, calcium carbonate, zinc oxide, and mixtures thereof. In some examples the white pigment particle may comprise an alumina-TiO2 pigment. The colorant may be present in the fluid print agent composition in an amount of from 10 wt % to 80 wt % of the total amount of resin and colorant, in some examples 15 wt % to 80 wt %, in some examples 15 wt % to 60 wt %, in some examples 15 wt % to 50 wt %, in some examples 15 wt % to 40 wt %, in some examples 15 wt % to 30 wt % of the total amount of resin and colorant. In some examples, the colorant may be present in the fluid print agent in an amount of at least 50 wt % of the total amount of resin and colorant, for example at least 55 wt % of the total amount of resin and colorant.

In some examples the print agent may also comprise a charge carrier component, e.g. a charge director and/or a charge adjuvant, such that the print agent may be electrically charged for controlled application of the thermoplastic print agent to form the image for instance by an electrostatic printing process such as liquid electrophotographic printing. In some examples, the charge adjuvant includes aluminum di- or tristearate. A print agent which may be electrically charged may also be referred to as an electronic ink or an electrostatic ink. In some examples the prink agent may comprise a liquid electrophotographic ink, for example ElectroInk® and any other Liquid Electro Photographic (LEP) inks developed by Hewlett-Packard Company. A "liquid electrophotographic ink" or "LEP ink" generally refers to an ink composition, in liquid form, generally suitable for use in a liquid electrostatic printing process.

Print agents comprising thermoplastic resin, such as LEP inks, may absorb ultraviolet (UV) radiation highly efficiently. In particular, colorant or pigments of a LEP inks may exhibit a relatively high absorption for UV radiation, for example an absorption of greater than 75%. Thus, components of the print agent comprising thermoplastic resin, for instance colorants of a print agent such as an LEP ink, may absorb the UV radiation, which results in heating of the print agent. The UV irradiation at block 120 thus causes direct heating of the print agent itself. In some examples the wavelength of the irradiating UV radiation can be selected such that the print agent absorbs a significant proportion or substantially all of the UV radiation.

Figure 2A:
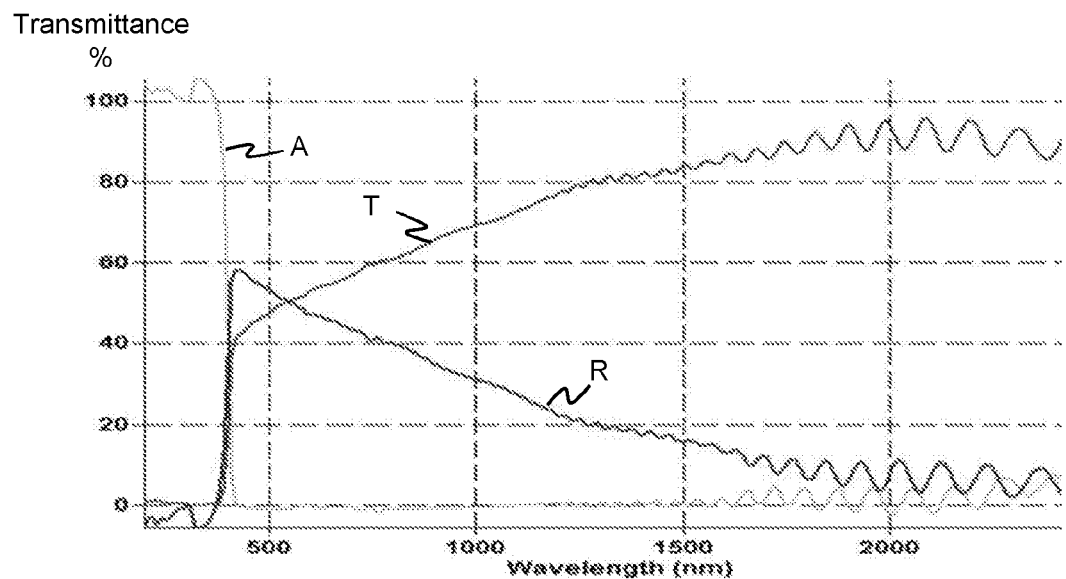
FIGS. 2a and 2b illustrate transmission and absorbance spectra of examples of white and black thermoplastic inks respectively.
Figure 2B:
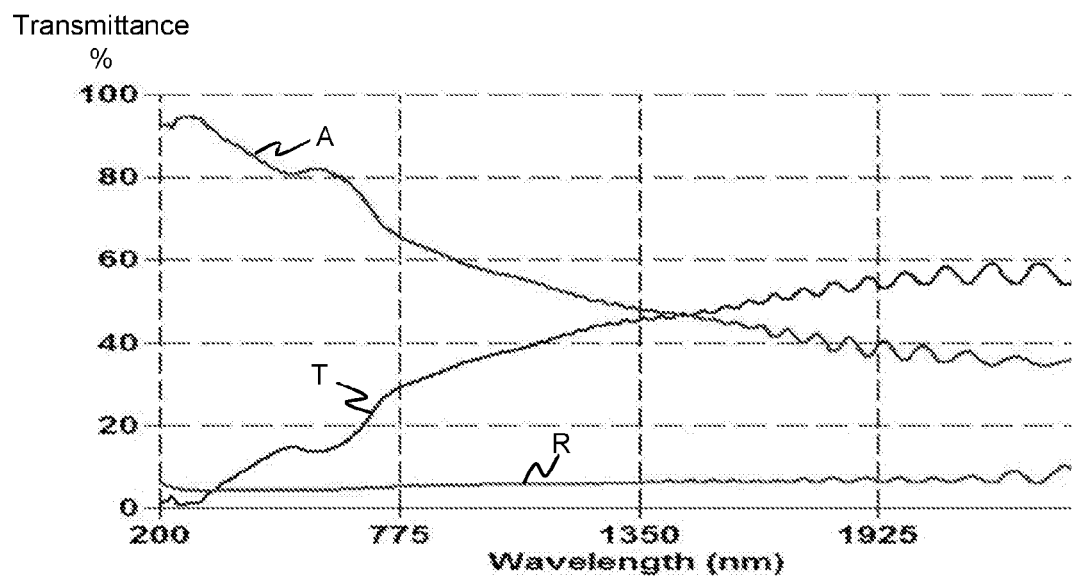

FIGS. 2a and 2b illustrate transmission spectra for examples of white and black LEP inks respectively and also illustrate the relative absorption and reflection from such inks.

At wavelengths from about 300 nm up to about 450 nm, for both white ink and black ink, the absorption efficiency of the ink is high. In these examples the absorption efficiency at a wavelength of 395 nm is nearly 100% for the white ink and around 90% for the black ink. Similar absorption efficiencies may also be experienced for other colorants used for fluid print agents comprising thermoplastic resin. In some examples therefore the irradiating UV radiation may comprise radiation within the wavelength range of 300 nm to 450 nm. In some examples, a waveband of the ultraviolet radiation may be between about 360 nm to 420 nm, for example from about 385 nm to about 395 nm.

The high absorption efficiency for white ink for ultraviolet wavelengths provides an efficient way to heat white ink in particular. At other wavelengths, white ink may be mainly reflective and thus may not exhibit significant absorption.

The UV radiation may be generated by a UV source and in some examples, the ultraviolet source comprises an UV light emitting diode (LED) array. In some examples, the UV LED array may comprise at least one 395 nm LED, i.e. an LED that generates output radiation predominately at a wavelength of 395 nm. In some examples the UV LED array may comprise at least one 385 nm LED. In some examples the UV LED array may comprise at least one 365 nm LED. LEDs that output at wavelengths of 365 nm, 385 nm or 395 nm are available with good power efficiency.

The ultraviolet source may be narrowband in that the majority of the optical power in the output of the ultraviolet narrowband source is located within one, or a few, narrow wavelength bands, for example a waveband that extends across a wavelength range of 50 nm or less, or less than 30 nm of less. In some examples, the majority of the optical power may be located within a single narrow ultraviolet waveband, although in some examples there may be a small number, for example one or two, additional narrow wavebands selected for efficient heating of the print agent. In one example, the waveband of the irradiating ultraviolet radiation is chosen such that an absorption efficiency of the colorant is at least 75% across the waveband.

The print agent on the first surface may thus be directly heated by the UV irradiation during the irradiation at block 130 of the method of the example of FIG. 1, to increase the temperature of the print agent. The fluid print agent may be heated to aid in evaporation of the carrier fluid, i.e. the heating at block 130 due to the UV irradiation may be at least part of a drying process. The print agent on the first surface may also be heated to cause melting of the thermoplastic resin of the print agent, to allow the thermoplastic resin in continuous areas of the thermoplastic print agent to fuse together. However, there is no, or very little, direct heating of the substrate and any heating of the substrate will be via conduction from the heated print agent, which provides a low amount of heat transfer.

The method of the example of FIG. 1 can provide a power efficient heating of the print agent as the radiated energy from the UV illumination is efficiently absorbed directly by the print agent. This can provide a power efficient heating to melt the thermoplastic resin of the print agent, to allow for fusing of the print agent. In some examples this can also provide a power efficient drying of the fluid print agent.

As noted, the irradiation of the fluid print agent may cause evaporation of the carrier fluid and also heats the print agent to melt the thermoplastic resin of the print agent. The individual particles of thermoplastic resin melt and merge together such that continuous areas of the thermoplastic print agent on the drying surface can fuse together. In one example the thermoplastic resin of the print agent is heated to a temperature of at least 70° C. to melt the thermoplastic material.

In some examples, irradiating the print agent with ultraviolet radiation includes irradiating the print agent with a defined exposure time to heat the print agent to melt the thermoplastic resin. In some examples, the print agent on the first surface may be moved with respect to at least one source of UV radiation at a defined speed. The UV illumination may be controlled based on the relative speed of movement, for example, to achieve a certain radiation dose. In some examples, the UV irradiation may be controlled based on at least one characteristic of the image formed from the print agent. For example, the UV irradiation may be controlled according to at least one of: the type of print agent, for example, the colour or colours of component inks forming the image; a thickness of the layer of print agent and a coverage type, for example dots or continuous coverage, of the print agent. The UV irradiation may be controlled to vary spatially or temporally based on spatial or temporal variations of any of these properties. The UV irradiation may therefore be non-uniform. For example, a radiation dose may be controllably varied across the image so that different parts of the image receive a different dose. This variation may include a variation for different parts of the image in the direction of relative movement of the image to the UV source and also in a direction orthogonal to the direction of relative movement. In some examples, the print agent on the first surface may be irradiated with UV radiation from at least one UV source, and at the source may be an LED array wherein individual LEDs may be controlled to controllably apply the UV irradiation.

In some examples, the UV irradiation may be applied by a continuous illumination of the print agent. In some examples, the UV irradiation may comprise a plurality of different exposures, for instance, a first exposure followed a short time later by a second exposure, which may be exposures from the same UV source or from spatially separated UV sources.

In some examples there UV irradiation may be applied by a continuous illumination of the print agent. In some examples the UV irradiation may comprise a plurality of different exposures, for instance a first exposure followed a short time later by a second exposure, which may be exposures from the same UV source or from spatially separated UV sources.

UV radiation, for example UV radiation centred on a wavelength of 395 nm, can heat the thermoplastic resin of the print agent to a temperature of at least 70° C. more efficiently than other techniques, such as using infrared sources or hot air convection, especially when such techniques are also used for drying the fluid print agent.

In some examples the first surface, on which the image is formed from fluid print agent at block 120 of FIG. 1, and on which the thermoplastic print agent is irradiated with UV radiation at block 130, may be an intermediate surface, i.e. a surface of an intermediate transfer member which does not form part of a final print product. As noted above, in some print processes the fluid print agent may be controllably applied to an intermediate surface, for example a surface of an intermediate drum or some other transfer member, and dried on the intermediate surface. The print agent may also be heated to melt the thermoplastic resin of the print agent, and allowed to fuse, on the intermediate surface. After the thermoplastic print agent has been dried and fused, it may be transferred to a print substrate for the print product, for example by contact pressure.

The methods, apparatus and systems of the present disclosure are applicable to print processes that dry the print agent and melt the thermoplastic resin of print agent on an intermediate surface, prior to transfer of the fused thermoplastic print agent to a print substrate. As noted, drying the print agent and melting the thermoplastic resin of the print agent by UV irradiation is power efficient compared to other methods, such as the use of infrared sources or hot air knives. In addition, the UV irradiation results in less heating of the intermediate surface, which can reduce the need for the intermediate surface to be able to withstand relatively high temperature or any cooling of components associated with the intermediate drum.

In some examples however the first surface, on which the image is formed from fluid print agent at block 120 of FIG. 1, and on which the print agent is irradiated with UV radiation at block 130, may be a surface of a print substrate for a print product to be produced. In such examples the print agent may thus be controllably applied in a fluid form to a print substrate, for example some print media, that will form part of the print product.

The methods, apparatus and systems of the present disclosure are thus applicable to print processes that dry the print agent and melt the thermoplastic resin of the print agent on a print substrate that will form part of the print product. Thus, in examples, the need for an intermediate surface for drying the print agent, with the associated cost, space and complexity requirements, can be avoided. In some examples the print substrate may be a substrate comprising a plastic material. In some examples the UV irradiation, for instance the optical power of the UV irradiation, may be controlled based on the type of print substrate.

Some print substrates may be degraded by any significant heating. For example, significant heating of a print substrate may result in distortion of the print substrate or a degradation of the properties of the substrate. Especially for print substrates that comprises plastic material, heating of the print substrate could result in distortion of the substrate, for example shrinkage, warping or bending or a degradation of the mechanical properties of the substrate. For some print substrates that comprises plastic material, degradation of the substrate may occur if the substrate is heated to a temperature or greater than about 50° C. or so. Therefore, previously, heating a print agent to a temperature to melt the thermoplastic resin of the print agent, for example to a temperature greater than 70° C., would not have been seen as being compatible with maintaining print substrates at a temperature to avoid degradation, for example below 50° C.

As discussed however, irradiating the print agent with ultraviolet radiation at block 130 of the method of FIG. 1 can provide direct heating of the print agent but without significant direct heating of the underlying surface. Heat transfer to the print substrate may primarily arise from conduction from the heated print agent, however the amount of heat transfer may be low.

In some examples therefore irradiating the print agent with ultraviolet radiation to heat the print agent to melt the thermoplastic resin at block 130 of the method of FIG. 1 involves irradiating the print agent on a print substrate that will form part of the print product. The print agent may be irradiated with UV radiation to heat the thermoplastic resin to a temperature of least 70° C. The thermoplastic resin of the print agent may be heated to this temperature without the temperature of the print substrate exceeding a temperature of about 50° C.

Figure 3:
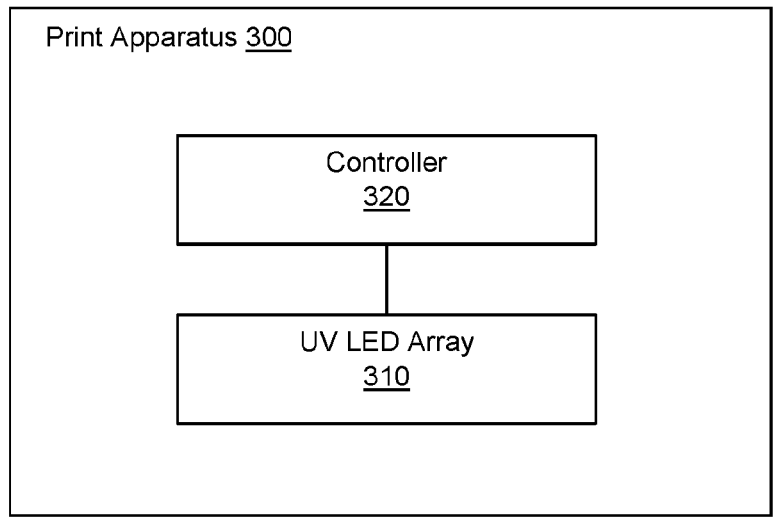
FIG. 3 shows a simple schematic of an example of a print apparatus.

FIG. 3 illustrates a simplified schematic of an example of a printer heating unit 300. The printer heating unit 300 comprises an ultraviolet (UV) LED array 310 and a controller 320. In some examples, the ultraviolet LED array 310 may comprise at least one 395 nm UV LED. In some examples, the ultraviolet LED array 310 may comprise at least one 385 nm UV LED. In some examples, the ultraviolet LED array 310 may comprise at least one 365 nm UV LED. UV LEDs with output wavelengths of 365 nm, 385 nm or 395 nm are readily available with good power efficiency.

The controller 320 controls the UV LED array 310 to output ultraviolet radiation to cause heating of a fluid print agent comprising thermoplastic resin in a carrier fluid to evaporate the carrier fluid and melt the thermoplastic resin. In some examples the controller 320 controls the UV LED array 310 to output ultraviolet radiation to cause heating of the thermoplastic resin to a temperature of at least 70° C. In some examples the controller controls the UV LED array 310 based on at least one characteristic of the printed image and may controllably vary the illumination spatially or temporally based on variations in the printed image. In some examples the controller controls the UV LED array 310 based on at least one characteristic of a print substrate on which the image is formed.

Figure 4:
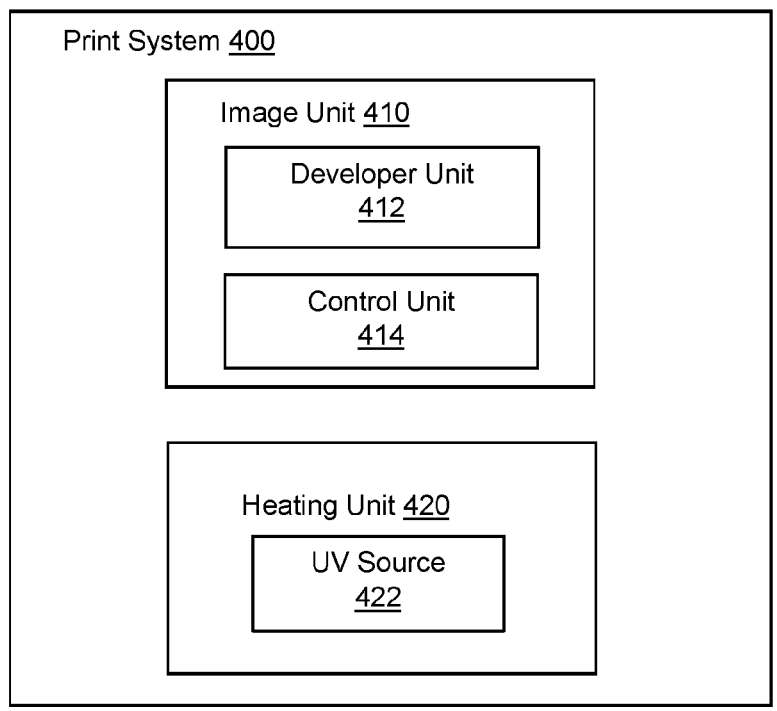
FIG. 4 shows a simple schematic of an example of a printer system.

FIG. 4 illustrates a simplified schematic of an example of a print system. The print system 400 comprises an image unit 410 to form an image on a first surface from a fluid print agent, the fluid print agent including particles of thermoplastic resin in a carrier fluid. The image unit 410 may be any suitable image unit for forming an image on the surface from fluid print agent including a thermoplastic resin. In some examples, the image unit 410 may operate by electrophotography or a similar process. The image unit 410 may comprise a developer unit 412 to develop a coating of electrically charged fluid print agent on a developer surface. The image unit 410 may also comprise a control unit 414 to control migration of the fluid print agent from the developer surface to form the image. In some examples, the developer unit 412 may comprise at least one binary ink developer. In some examples, the image unit 410 may be to form the image from the fluid print agent on a print substrate than will form part of the print product. In some examples, the print substrate may comprise a plastic material.

The print system 400 also comprises a heating unit comprising an ultraviolet source to irradiate the print agent on the first surface with ultraviolet radiation to melt the thermoplastic resin to allow the melted thermoplastic resin in continuous areas on the first surface to fuse together. In some examples the ultraviolet source comprises at least one ultraviolet LED. In some examples the ultraviolet source is to irradiate the image with ultraviolet radiation with a wavelength in the range of 360 nm to 420 nm.

Figure 5:
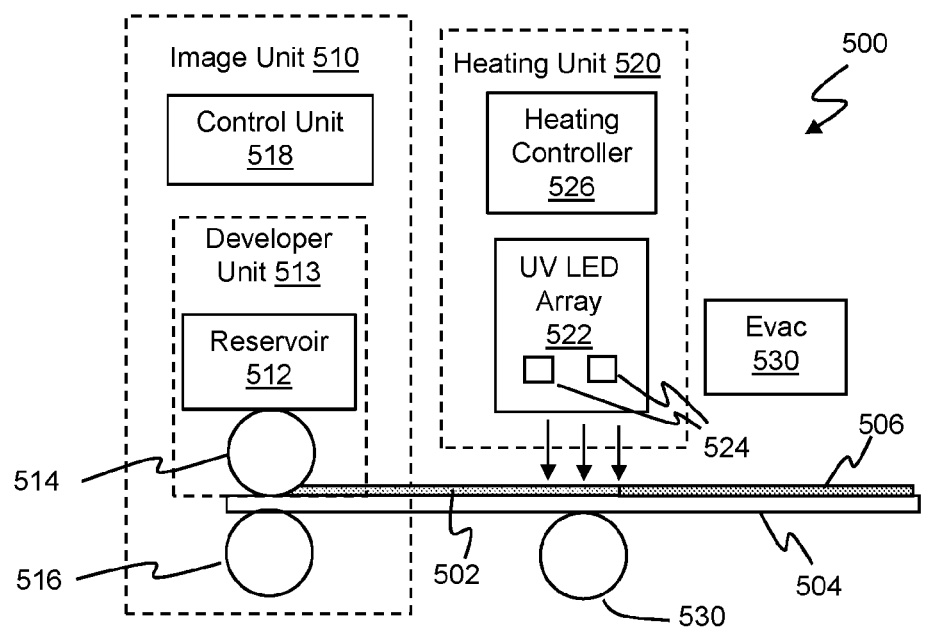
FIG. 5 shows a simple schematic of another example of a printer system.

FIG. 5 illustrates a simplified schematic of another example of a print system 500. The print system 500 of the example of FIG. 5 includes an image unit 510 to controllably apply a fluid print agent 502 that includes a thermoplastic resin, for example, an LEP ink 502, from a reservoir 512 of a developer unit 513 onto the surface of a print substrate 504. The substrate may be a print substrate for the print product, i.e. the print substrate 504 may comprise print media onto which the image is to be printed to provide a print product. In some instances, the print substrate 504 may comprise a plastic material, although any suitable type of print media may be used as the print substrate.

The image unit 510 controllably applies fluid print agent 502 from the reservoir 512 to the print substrate 504. In the example of print system 500 of FIG. 5, the fluid print agent may be capable of carrying an electric charge, for example, the fluid print agent may comprise an electrostatic ink, and the image unit 510 may controllably apply the thermoplastic print agent by electrically controlled transfer.

The image unit 510 controllably applies fluid print agent 502 from the reservoir 512 to the print substrate 504. In the example print system 500 of FIG. 5, the fluid print agent may be capable of carrying an electric charge, for example the fluid print agent may comprise an electronic ink, and the image unit 510 may controllably apply the thermoplastic print agent by electrically controlled transfer.

In the example of FIG. 5 the image unit 510 comprises at least a first electrode proximate a second electrode. In the example of FIG. 5 the first electrode is in the form of a first roller 514 and the second electrode is in the form of a second roller 516, with the print substrate passing between and being guided by the first and second rollers 514 and 516. Fluid thermoplastic print agent from the reservoir 512 may be applied to the first roller 514 by a suitable applicator of developer unit 513. In the example of FIG. 5 the surface of the first roller 514 may be a developer surface and the develop unit 513 is to apply an even coating of electrically charged fluid print agent to the developer surface. The first and second electrodes of the first and second rollers are controlled to be at a potential difference to one another by control unit 518. The control unit 518 controls the potential difference between the first and second roller electrodes 514 and 516 so that, in an application mode, the potential difference between the first and second roller electrodes 514 and 516 causes the electrically charged fluid print agent to migrate from the developer surface of the first roller 514 towards the second roller 514 and thus be applied to the print substrate 504 as it moves between the rollers 514 and 516.

The control unit 518 controls the potential difference between the first and second rollers 514 and 516 in the application mode to maintain an even coating of the thermoplastic print agent on the print substrate 504. In some examples the control unit 518 may control the potential difference based on the properties of the print substrate 502, for instance the thickness and dielectric constant of the print substrate 504 to maintain a controlled migration rate of fluid print agent 502 from the first roller 514 to the print substrate 514. In some examples the control unit 518 may control the rate at which the print substrate advances between the first and second rollers 514 and 516, for instance by controlling a rotation rate of at least one of the first and second rollers 514 and 516. The control unit 518 may also control the potential difference between the first and second rollers 514 and 516 in a non-application mode so that there is no migration of the fluid print agent from the first roller 514. The developer unit 513 may comprise a binary ink developer.

The print substrate 504 carrying the fluid thermoplastic print agent 502 is then conveyed to heating unit 520. In the example of FIG. 5, the heating unit comprises a UV LED array 522 with multiple UV LEDs 524 to irradiate the fluid print agent 502 on the print substrate 504 with UV radiation. A heating unit controller 526 may control illumination of the UV LED array 522 to irradiate the print agent 502 on the print substrate 504 to evaporate carrier fluid from the fluid print agent 502. There may be an evacuation unit 530 to evacuate the evaporated carrier fluid. The heating unit controller 526 may control illumination of the UV LED array 522 to irradiate the print agent 502 on the print substrate 504 to melt the thermoplastic resin of the print agent 502. The melted thermoplastic resin in continuous areas on the substrate may merge together. When no longer irradiated by UV radiation from the UV LED array 522, the thermoplastic resin of the print agent may cool and set to form a fused image 506 on the print substrate 504.

When being irradiated with UV radiation from the heating unit 520, the opposite side of the print substrate 504 to the print agent 502 may be in contact with a cooling surface, for example the surface of a cooled roller 530. The cooled surface provides cooling to the print substrate 504 to mitigate the effect of any heat transfer from the heated print agent to the print substrate 504.

The print substrate 504 carrying dried and fused print agent 506 may then be conveyed to a downstream part of the printer system.

In other examples the image unit may comprise an electrophotography imaging unit and the image unit may comprise a photoconductive surface, e.g. a photoconductive drum. A pattern of charge corresponding to a latent image may be formed on the photoconductive drum. A coating of electrically charged print agent may be applied to a developer surface, e.g. the surface of a developer roller, and the developer surface may engage with the photoconductive surface to selective migrate fluid print agent to the photoconductive surface. The fluid print agent may then be transferred from the photoconductive surface to the first surface, possibly be at least one transfer surface, such as the surface of a transfer drum or belt.

As used herein, "melt flow rate" generally refers to the extrusion rate of a resin through an orifice of defined dimensions at a specified temperature and load, usually reported as temperature/load, e.g. 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer, as known in the art. If a melt flow rate of a particular polymer is specified, unless otherwise stated, it is the melt flow rate for that polymer alone, in the absence of any of the other components of the electrostatic composition.

As used herein, "acidity," "acid number," or "acid value" refers to the mass of potassium hydroxide (KOH) in milligrams that neutralizes one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the liquid toner composition.

As used herein, "melt viscosity" generally refers to the ratio of shear stress to shear rate at a given shear stress or shear rate. Testing is generally performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @ 140° C., units are mPa-s or cPoise, as known in the art. Alternatively, the melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate. If the melt viscosity of a particular polymer is specified, unless otherwise stated, it is the melt viscosity for that polymer alone, in the absence of any of the other components of the electrostatic composition.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   applying a coating of electrically charged fluid print agent to a developer surface, the fluid print agent comprising particles of thermoplastic resin in a carrier fluid;
   controlling migration of fluid print agent from the developer surface to form an image from fluid print agent on a first surface; and
   irradiating the print agent on the first surface with ultraviolet radiation to heat the print agent to a temperature of at least 70° C. to melt the thermoplastic resin.

2. The method as claimed in claim 1 wherein irradiating the thermoplastic print agent with ultraviolet radiation comprises irradiating the thermoplastic print agent with ultraviolet radiation with a wavelength in the range of 360 nm to 420 nm.

3. The method as claimed in claim 1 wherein irradiating the thermoplastic print agent with ultraviolet radiation comprises controllably varying the UV radiation incident on the thermoplastic print agent based on at least one characteristic of the image.

4. The method as claimed in claim 1 wherein the first surface comprises a surface of a print substrate for a print product.

5. The method as claimed in claim 4 wherein applying the fluid print agent to the surface of the print substrate comprises locating the print substrate between first and second electrodes, wherein the developer surface is a surface of the first electrode and controlling migration of the fluid print agent comprises controlling the potential difference between the first and second electrodes to control migration of the fluid thermoplastic print agent from the developer surface towards the second electrode.

6. The method as claimed in claim 4 wherein the print substrate comprises a plastic material and the method comprises maintaining the print substrate at a temperature of no greater than 70° C. whilst irradiating the print agent on the first surface with ultraviolet radiation to melt the thermoplastic resin.

7. The method as claimed in claim 1 wherein the first surface comprises a surface of an intermediate transfer member and the method comprises, after irradiating the print agent on the first surface with ultraviolet radiation, transferring the image formed from the print agent to a print substrate.

8. The method as claimed in claim 1 wherein irradiating the print agent with ultraviolet radiation comprises exposing the print agent on the first surface to a plurality of exposures of ultraviolet radiation.

9. The method of claim 1, wherein irradiating the print agent is performed with an array of ultraviolet light emitting diodes (LEDs).

10. The method of claim 9, further comprising, controlling the ultraviolet LED array to vary the ultraviolet radiation spatially or temporally based on variations in a printed image formed by the fluid print agent or controlling the ultraviolet LED array based on at least one characteristic of a print substrate on which the image is formed.

11. A print system comprising:
an image unit to form an image on a first surface from a fluid thermoplastic print agent, the fluid print agent comprising particles of thermoplastic resin in a carrier fluid; the image unit comprising:
a developer unit to develop a coating of electrically charged fluid print agent on a developer surface; and
a control unit to control migration of the fluid print agent from the developer surface to form the image; and
a heating unit comprising an ultraviolet source to irradiate the print agent on the first surface with ultraviolet radiation to melt the thermoplastic resin to allow the melted thermoplastic resin in continuous areas on the first surface to fuse together.

12. A print system as claimed in claim 11 wherein the ultraviolet source comprises at least one ultraviolet LED.

13. A print system as claimed in claim 11 wherein the ultraviolet source is to irradiate the image with ultraviolet radiation with a wavelength in the range of 360 nm to 420 nm.

14. A print system as claimed in claim 11 wherein the image unit is to form an image on the first surface which is a surface of a print substrate.

15. A print system as claimed in claim 14 wherein the image unit comprises a first electrode and a second electrode to receive the print substrate between the first and second electrodes and the developer surface is a surface of the first electrode and the control unit is to control a potential difference between the first and second electrodes to control migration of fluid print agent from the developer surface towards the second electrode.

16. A print system as claimed in claim 14 comprising a cooling surface on an opposite side of the print substrate to the print agent to cool the print substrate.

17. The print system of claim 11, further comprising an intermediate transfer member comprising the first surface and disposed to receive the image formed of fluid thermoplastic print agent from the image unit, wherein the heating unit is structured to irradiate the print agent on the first surface of the intermediate transfer member.

18. A printer heating unit comprising:
an ultraviolet LED array; and
a controller to control the ultraviolet LED array to output ultraviolet radiation to cause heating of a fluid print agent comprising thermoplastic resin in a carrier fluid to evaporate the carrier fluid and melt the thermoplastic resin.

19. The printer heating unit of claim 18, further comprising a cooled roller opposite the ultraviolet LED array to cool a surface of a print substrate being irradiated by the ultraviolet LED array.

20. The printer heating unit of claim 18, wherein the array of ultraviolet LEDs comprises LEDs with different ultraviolet central wavelengths.

* * * * *